Jan. 5, 1960 E. F. WELLER, JR., ET AL 2,919,576
ENGINE INDICATOR APPARATUS
Filed Aug. 18, 1954 9 Sheets-Sheet 1

INVENTORS
Edward F. Weller, Jr. &
BY Albert S. Lecky
L. O. Burch
ATTORNEY

INVENTORS
Edward F. Weller, Jr. &
BY Albert S. Lecky
ATTORNEY

United States Patent Office 2,919,576
Patented Jan. 5, 1960

2,919,576
ENGINE INDICATOR APPARATUS

Edward F. Weller, Jr., Detroit, and Albert S. Lecky, Centerline, Mich., assignors to General Motors Corporation, Detroit, Mich., a corporation of Delaware Application August 18, 1954, Serial No. 450,596

2 Claims. (Cl. 73—115)

This invention relates to measuring apparatus specially suited for use in engine indicator (card) studies and, more particularly, to apparatus for obtaining accurate measurements of engine crank angle for plotting of pressure-time indicator diagrams of internal combustion engines and the like.

Such measurements can be made with a pressure responsive device such as a balanced diaphragm pickup one side of which is exposed to the pressure within the engine cylinder and the other to an adjustable known source of static balancing pressure. When the pressure within the engine cylinder balances the static pressure on the diaphragm, the diaphragm flexes or "flips" to make or break a pair of electrical contacts which are connected in controlling relation with a stroboscopic flash lamp that illuminates the engine flywheel. The engine flywheel is calibrated in angular degrees from which the crank angle at which the contacts of the balanced diaphragm are actuated may be read and plotted against the balancing pressure.

Figure 1:
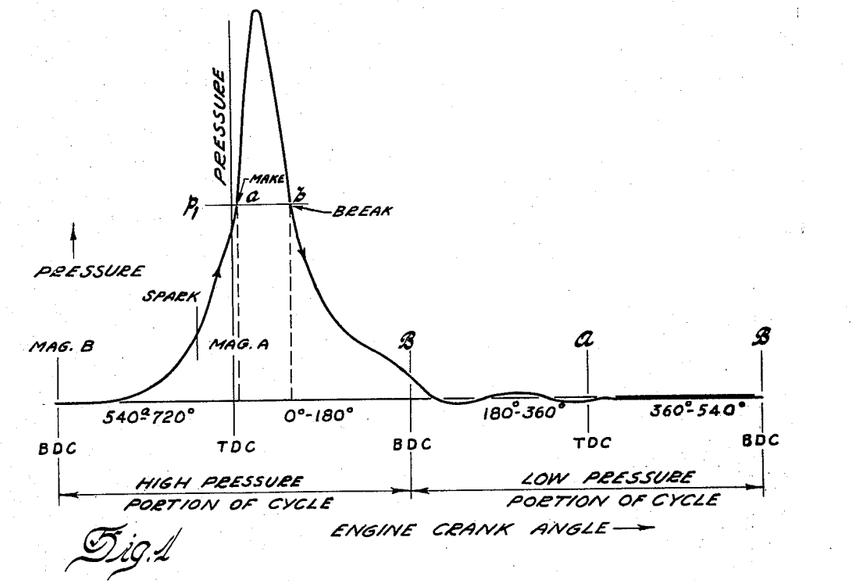
Fig. 1 illustrates a pressure-time diagram such as might be obtained with the apparatus of the present invention.

As can be appreciated, the above form of rudimentary apparatus does not enable accurate measurements of crank angle. The manner in which the crank angle is displayed makes reading thereof subject to error which may be further increased by the delay or lag in the flasher device, conventional forms of which are characterized by appreciable delay from the instant the contacts of the balanced diaphragm are actuated to the time that a pulse of light is produced to illuminate the flywheel. The apparatus, moreover, is severely limited in the "multiple-flip" or low pressure pumping portion of the engine cycle, as illustrated in Fig. 1 herein, where there may be several crank angles in the cycle corresponding to a particular low pressure or where the pressure fluctuates several times each cycle. In this case the flasher will illuminate the flywheel several times during each revolution, yielding superimposed crank angle indications and making reading thereof virtually impossible.

This last-mentioned difficulty can be avoided by the employment of mechanical commutator or contactor devices driven by the crankshaft and having movable contactors or sliding brushes adapted to be rotatably adjusted so as to select either a make or break occurrence of the contacts of the balanced diaphragm device at any crank angle and to reject all others. Such mechanical devices, however, do not permit of changing the commutating interval while the engine under investigation is running and, moreover, are designed for use on a particular engine and cannot be installed readily on other engines without physical design changes therein.

Accordingly, the present invention has among its objects to provide an improved form of balanced diaphragm indicator apparatus which avoids the aforementioned and other deficiencies of prior art apparatus of this character, which can be used interchangeably in a plurality of engine installations, which enables an extremely accurate measurement of the engine crank angle to be made on an easy-to-read reference standard electrical indicating instrument and at a location remote from the engine, and which affords a selection of reading the crank angle either from an electrical meter or from the engine flywheel with a flash lamp and a flasher control unit having a low lag characteristic.

Other objects are to provide such measuring apparatus which is completely electronic in character, and which features means for producing a narrow electrical pulse at the instant the contacts in the balanced diaphragm are actuated to make or break, means affording a ready selection of either the make or break event of the balanced diaphragm, electronic commutating means for selecting the crank angle at which the contacts of the pressure diaphragm are actuated if the contacts are caused to make and break more than once or several times in an engine cycle, means for automatically synchronizing the commutating means with the engine, and means for producing an average current or electrical signal which is proportional to the engine crank angle at which the contacts of the balanced diaphragm open or close.

The above and other objects, features and advantages of the present invention will appear more fully from the following detailed description and drawings wherein.

Referring to the drawings, Fig. 1 illustrates a pressure-versus crank angle diagram of an internal combustion engine such as might be plotted from the results obtained with the apparatus of the present invention. Such diagrams involve the measurement of pressure under dynamic conditions and are useful in studying the engine cycle, and the effect of such variables as ignition, valve timing, fuel mixture, indicated horsepower and rates of pressure rise. The compression and expansion portions of the operating cycle of the engine are shown as occurring in the high pressure portion of the curve with the exhaust and suction portions shown in the low pressure or pumping portion thereof.

Figure 2:
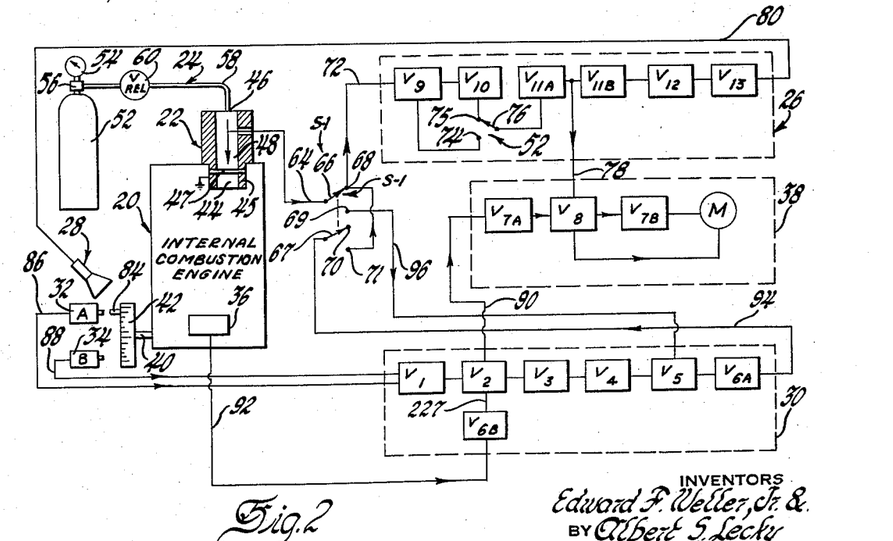
Fig. 2 is a general block diagrammatic illustration of the components of a measuring apparatus in accordance with the present invention.

Fig. 2 is a generalized block diagrammatic showing of the components of the apparatus of the present invention for obtaining a pressure-time diagram in the nature of Fig. 1 of an internal combustion engine 20, and includes, in the main, a balanced diaphragm pickup device 22 and associated pressure regulating and control apparatus 24 therefor, low lag flasher control unit 26 having a flash lamp unit 28 associated therewith, a balanced diaphragm signal selector or electronic commutator unit 30 having a pair of magnetic pickup commutating signal devices 32, 34 and a synchronizing spark pickup device 36 associated therewith, and a crank angle voltage generator and display unit 38.

The engine 20 is shown with its crank shaft 40 mounting a flywheel 42 having angular graduations and indicia around the periphery thereof and with an opening 44 in the head thereof communicating with an engine cylinder for receiving the balanced diaphragm 22 therein. The diaphragm may be of the type more fully shown and described in the article entitled "An Improved Indicator for Measuring Static and Dynamic Pressures" by C. E. Grinstead, R. N. Frawley, F. W. Chapman and H. F. Schultz appearing at pages 534–556 of the Transactions of the SAE Journal, volume 52, Number 11 for November, 1944, and comprises, in general, a housing 45 having a pressure inlet 46 therein, a flexible diaphragm 47 one side of which is adapted to be exposed to the pressure within the engine cylinder and the other to the balancing pressure, and an electrical contact or electrode assembly including a stationary contact or electrode 48 and the movable or flexing diaphragm itself.

The pressure regulating and control apparatus 24 includes a tank 52 containing a compressed gas such as nitrogen under pressure, a pressure gauge 54, a pressure regulating valve 56 for adjusting or varying the static balancing pressure supplied to the pressure inlet of the balanced diaphragm over a pressure line 58, and a pressure relief valve 60 for bleeding line 58 to atmosphere. The pressure regulating and control apparatus may also include a suitable vacuum tank and pump when working with vacuum or negative pressures.

The contacts of the balanced diaphragm pickup device are connected by electrical line 64 to a D.P.D.T. commutator selector switch S–1 having a pair of switch arms 66 and 67 and contacts 68, 69 and 70, 71, associated with the respective switch arms. With switch arm 66 engaging contact 68 the balanced diaphragm pickup device is connected over line 72 to the input of the flasher control unit 26 which includes a squaring amplifier ($V_9$), inverter ($V_{10}$), a "make" or "break" selector switch S–2, clipper amplifier ($V_{11A}$), inverter ($V_{11B}$), cathode follower ($V_{12}$) and modulator stage ($V_{13}$).

Before undertaking a detailed description of the construction and operation of the flasher control unit, its operation will be taken up briefly. The opening and closing of the balanced diaphragm indicator contacts develops a square wave at the input of the squaring amplifier ($V_9$), the output of which is applied to the input of inverter ($V_{10}$) and to one of the contacts 74 of the selector switch S–2, the other contact 75 of which is connected with the output of ($V_{10}$). Selector switch S–2 enables the selection of a signal corresponding to the make or break interval of the balanced diaphragm indicator and applies the selected signal to a differentiator circuit in the input of the clipper-amplifier ($V_{11A}$). The latter supplies a negative pulse as an output signal over electrical line 78 to the crank angle voltage generator section 38, later to be described, and also to the inverter ($V_{11B}$) of the flasher control unit 26. The inverter stage ($V_{11B}$) inverts the negative pulse from the clipper amplifier ($V_{11A}$) and applies a positive pulse to the cathode follower stage ($V_{12}$) which reduces the impedance level to that necessary to drive the flasher modulator stage ($V_{13}$) the output of which, taken over line 80, may either trigger a flash lamp in the lamp unit 28 or be used in known manner with a drum recorder for obtaining indicator cards.

Figure 6:
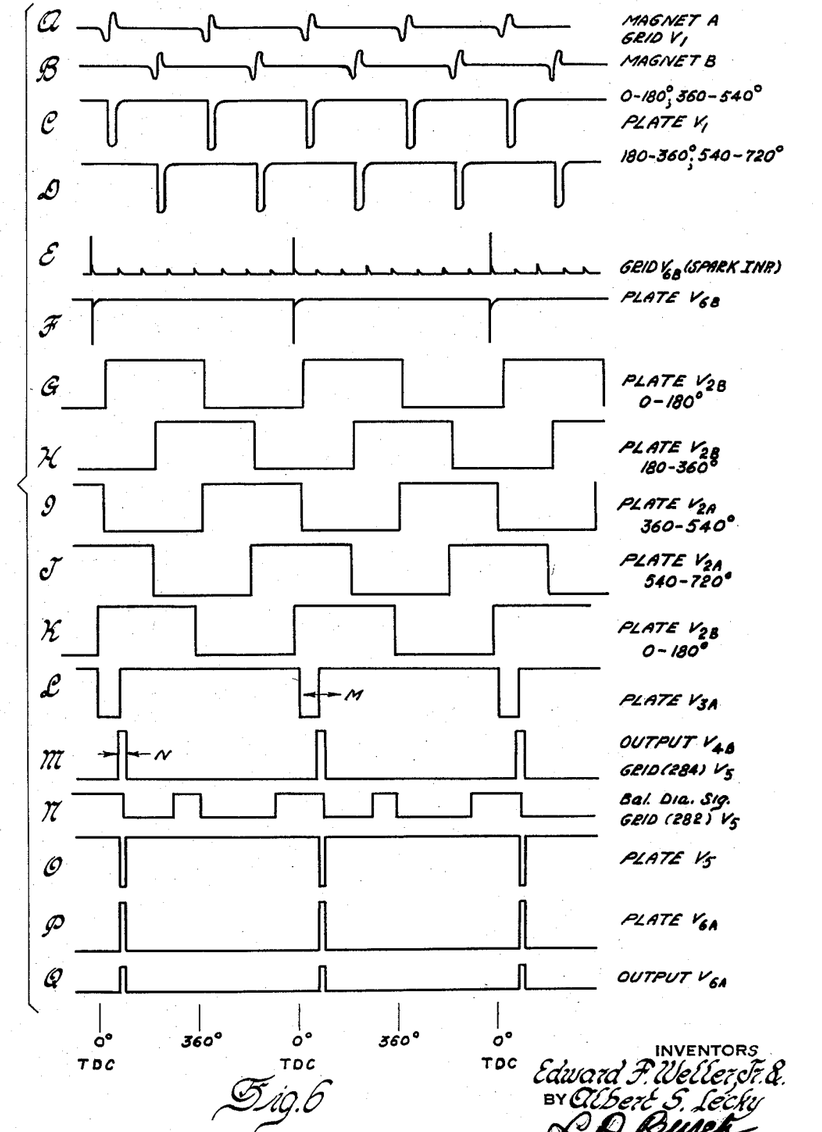
Figs. 6, 7 and 8 illustrate timing wave forms useful in understanding the operation of the electronic commutator of Fig. 5.

The magnetic pickup devices 32 and 34 associated with the balanced diaphragm signal selector or electronic commutator 30 may be of the type more fully shown and described in Patent Number 2,662,996, issued on December 15, 1953, to E. J. Martin and assigned to the present assignee. The devices are located 180 degrees apart at positions corresponding to top dead center and bottom dead center of the engine with reference to the pressure-time diagram of Fig. 2 and are individually adapted to produce timing or commutating signals such as are illustrated in Figs. 6A and 6B, respectively, each time a pin or stud 84, shown on the flywheel 42, passes by a respective one of the devices.

The signals developed by the individual magnetic pickup devices are applied over lines 86 and 88 to the electronic commutator unit 30 which further comprises a clipper amplifier stage designated as ($V_1$), a half-frequency square wave generator ($V_2$) the output of which is applied over line 90 to the crank angle voltage generator and display unit 38 and also to the input of a first gate position generator ($V_3$) followed by a second gate generator ($V_4$), a coincidence circuit ($V_5$), and inverter ($V_{6A}$). The half-frequency square wave generator ($V_2$) also is connected to receive a synchronizing input pulse from a clipper amplifier ($V_{6B}$), which may be associated with the inverter ($V_{6B}$) and has its input connected to the spark pickup device 36 over line 92.

The spark pickup device 36 may be of the type more fully shown and described in copending patent application S.N. 196,882, filed November 21, 1950, now Patent No. 2,701,335, in the names of Walter E. Sargeant and Edward F. Weller, Jr., and assigned to the present assignee. The pickup is actuated by the current pulse which causes the spark and is so designed that it may be readily mounted in association with the high tension cable for the spark plug associated with the cylinder in the engine under investigation.

A gated balanced diaphragm signal is supplied from the output of the inverter ($V_{6A}$) over line 94 to the flasher control unit 26 through switch arm 67 and contact 71 of the commutator selector switch S–1 when it is moved to the opposite position shown, the contacts of the balanced diaphragm then being connected over line 96 to the input of the coincidence circuit ($V_5$) of the electronic commutator unit.

In brief, the operation of the commutator is as follows. The signal from one or the other of the magnetic pickups 32 or 34 is selected and applied to the input of ($V_1$) which supplies a clipped and amplified signal to trigger the half-frequency square wave generator ($V_2$). The latter is employed because the commutator is to conduct only once each 720 engine degrees and each magnetic pickup produces two pulses each 720 engine degrees. The spark pickup signal is clipped and amplified in clipper ($V_{6B}$) and used as a synchronizing pulse for the half-frequency generator ($V_2$) in order to keep it locked in step with the engine.

The output from the half-frequency square wave generator ($V_2$) is used as a reference signal and fed over line 90 to the crank angle voltage generator unit 38 and has another portion of the output thereof differentiated in the input of ($V_3$) which is a gate position adjustable delay multivibrator. The delay in this stage can be varied over the full 720 engine degrees from 600 to 4000 r.p.m., but in general is used only on 180 degree segments of the complete engine cycle. The output from ($V_3$) is differentiated in the input of the second delay multivibrator ($V_4$) which is the gate generator producing the commutating or gating pulse. The width of the gate in ($V_4$) can be controlled from a minimum of 1 degree or less at all speeds, to a maximum of 8 degrees at 100 r.p.m., or 20 degrees at 4000 r.p.m. The gate pulse from ($V_4$) is applied to the gate or coincidence circuit ($V_5$) along with the balanced diaphragm indicator signal from the commutator selector switch S–1 when the latter is in the opposite position shown. Only if the two signals—the gate and the balanced diaphragm—occur simultaneously, will a pulse pass through the coincidence circuit. Since the output of the gate or coincidence circuit ($V_5$) is negative, inverter stage ($V_{6A}$) is employed in order to feed the input of the flasher control circuit 26 a properly poled signal.

The crank angle voltage generator and display unit 38 shown in the generalized block diagrammatic illustration of Fig. 2 includes in the relative order named, a clipper amplifier ($V_{7A}$), which receives its input over line 90 from the half-frequency square wave generator ($V_2$) of the electronic commutator unit 30 and supplies its output to one of the inputs of a half-frequency square wave voltage generator ($V_8$) the other input of which receives the shaped balanced diaphragm pulse signal over conductor 78 from the clipper amplifier ($V_{11A}$) of the unit 26. The voltage generator ($V_8$) is an Eccles-Jordan trigger circuit, which is generally similar to the half-frequency square wave generator ($V_2$) of the commutator unit and supplies its output through a shunt meter protection circuit ($V_{7B}$) to the indicating meter (M), which may be a secondary standard precision 0-5 ma. milliammeter. The construction and operation of the crank angle voltage generator will be taken up more fully with the description of the flasher control unit and the electronic commutator unit.

Figure 3:
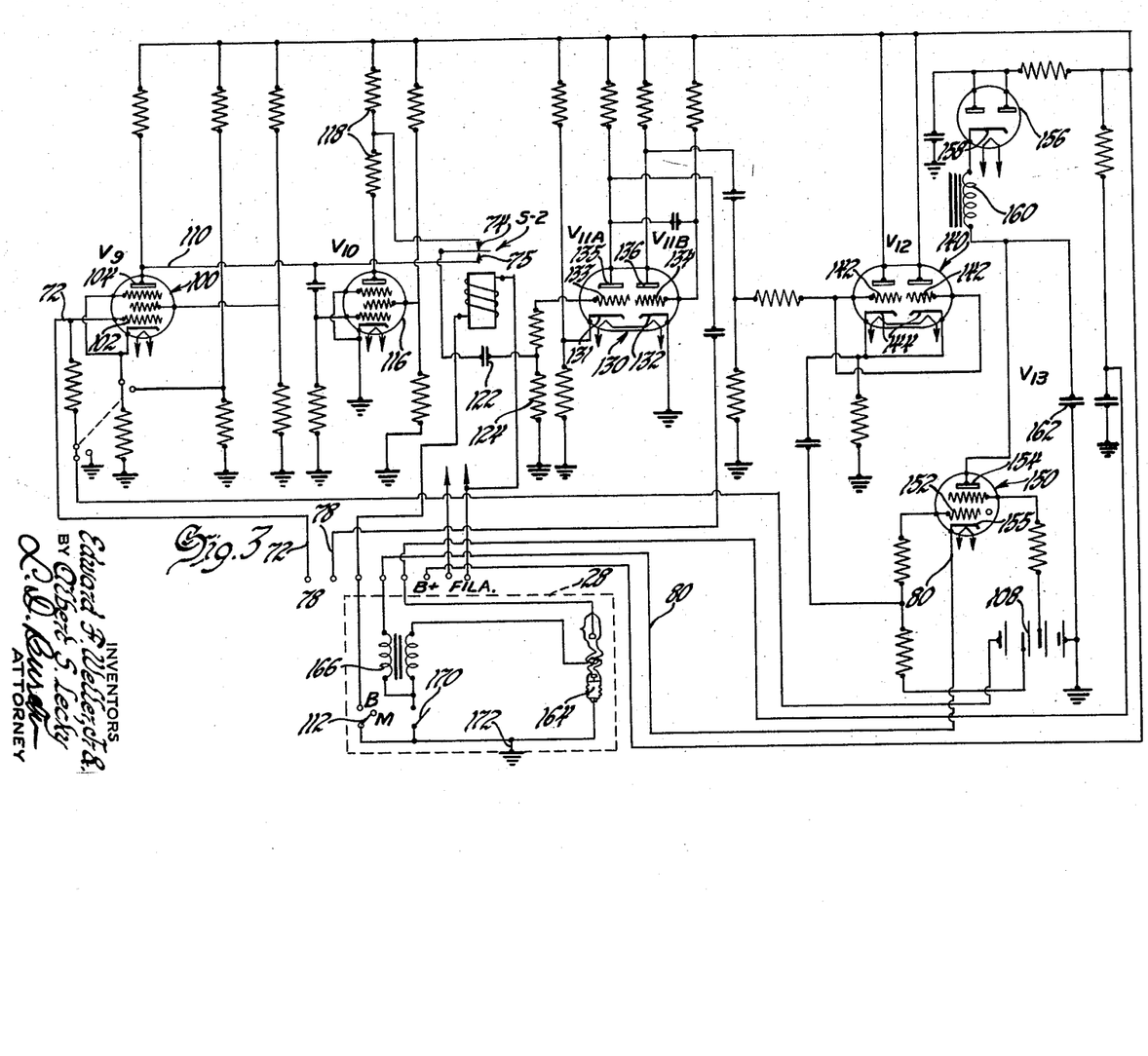
Fig. 3 is an electrical schematic circuit diagram of the balanced diaphragm pulse shaping and flasher control unit forming a part of the apparatus of Fig. 2.
Figure 4:
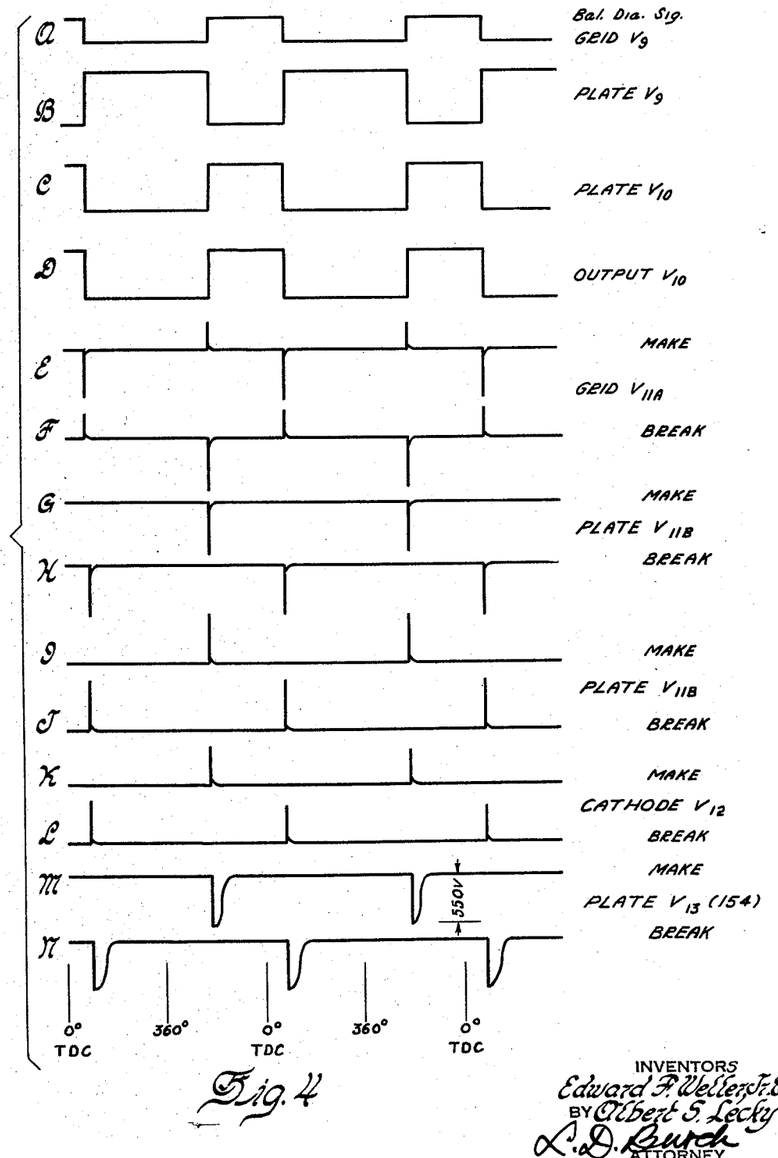
Fig. 4 illustrates timing wave forms useful in explaining the operation of Fig. 3.

Reference is now made to the circuit diagram of Fig. 3, and to the timing chart comprising the wave forms A to N of Fig. 4 relating to the balanced diaphragm flasher control unit 26. The squaring amplifier ($V_9$) is shown as including a pentode vacuum tube 100 the control grid 102 of which has a negative bias of about minus 7.5 volts applied thereto from a battery 103 in flasher modulator stage ($V_{13}$). The balanced diaphragm 22 is connected over conductor 72 to connect the control grid of tube 100 to ground or zero voltage when the contacts of the diaphragm are closed, causing the grid voltage to vary as shown in Fig. 4A. The variation in grid voltage of 100 produces a rise and fall of the potential of plate 104 in exact accordance with the opening and closing of the balanced diaphragm contacts, as shown in Fig. 4B.

The output of the squaring amplifier ($V_9$) is applied over line 110 to one contact of the "make-break" selector switch S-2 which is shown as a relay operated by a pushbutton 112 located at the flash lamp unit 28. The output of the squaring amplifier ($V_9$) also is applied to the input of the inverter stage ($V_{10}$) shown as a pentode 116 the output of which is taken from the junction of its divided plate load resistor 118 connected to the other contact 74 of relay switch S-2 and used when it is desired to read crankshaft angles, say, on the "make" of the balanced diaphragm contacts. The inverter stage ($V_{10}$) is employed in order to present a differentiated signal of positive polarity to the clipper amplifier stage ($V_{11A}$) in the "make," as well as in the "break" of the balanced diaphragm contacts. The plate load resistor 118 of the inverter is tapped in order to obtain the same amplitude output signal as that obtained from the plate 104 of the squaring amplifier ($V_9$) as is represented by Figs. 4C and 4D, Fig. 4D corresponding approximately to Fig. 4B except for the 180 degree phase reversal.

The output from either the squaring amplifier ($V_9$) or inverter ($V_{10}$) is selected by the relay S-2 depending on whether the "break" or "make" of the balanced diaphragm is wanted. This signal is then differentiated by a peaking or differentiator circuit located in the input of the clipper amplifier ($V_{11A}$) and constituted by a condenser 122 and resistor 124 connected to ground, yielding the wave forms of Figs. 4E and 4F corresponding to the make and break intervals of contactor operation. The differentiated signal is applied to the clipper amplifier stage ($V_{11A}$), which may be the first section of a double triode vacuum tube 130 having a pair of cathodes 131, 132; grids 133, 134; and plates 135, 136. The first section ($V_{11A}$) of the tube 130 is normally held at cut-off, and on the application of the positive part of the differentiated make or break signal to the grid 133, the first section ($V_{11A}$) of the tube conducts giving an inverted signal at its plate 135 and eliminating the negative pulse of Fig. 4E or 4F as shown in Figs. 4G and 4H. A timing wave corresponding to Fig. 4E or 4F also appears on output line 78 from the plate 135 of ($V_{11A}$) for application to the crank angle voltage generator 38. The output from ($V_{11A}$) is also applied to the grid 134 of the second or inverter section ($V_{11B}$) which may be contained in tube 130 and is normally at saturation, driving the tube to cut-off and yielding a clean sharp positive pulse at its plate 136, as shown in Figs. 4I and 4J.

The cathode follower ($V_{12}$) may comprise a double triode vacuum tube 140 the interconnected grids 142, 142 of which receive the positive pulse of Fig. 4I or 4J from the plate 136 of the inverter ($V_{11B}$) and serves as an impedance transformer or driving stage for the flasher modulator section ($V_{13}$) which includes a thyratron 150 and diode rectifier 156. The positive output pulse shown in Fig. 4K or 4L is derived from the interconnected cathodes 144, 144 of the cathode follower and is used to trigger the grid 152 of thyratron 150, which may be a type 3D22 thyratron tube, for example. The voltage for the plate 154 of thyratron 150 is obtained from a resonant charging system which includes the diode rectifier 156 and charging choke 160 connected between the cathode 158 of rectifier 156 and the plate 154 of 150, the cathode 155 of which is connected over output line 80 to the flash tube 164 which is located in the flash lamp unit 28 at the flywheel and is pulse modulated by the thyratron 150.

In operating, the condenser 162 in the plate circuit of thyration 150 is charged through rectifier 156 and choke 160 to about 500 volts, approximately twice the supply voltage which is obtained from a voltage regulated power supply designed along conventional lines. When the positive pulse from the cathode follower ($V_{12}$) is applied to the grid 152 of 150 causing the tube to conduct, the condenser 162 is discharged through the thyratron and the primary side of an ignition coil 166 located in the flash lamp unit 28. Because of the inductance in the cathode circuit of the thyratron, an oscillation is produced which cuts off the thyratron when the potential of its cathode 155 rises, and its plate potential falls to a point where conduction can no longer exist. The condenser voltage is shown in Figs. 4M and 4N. A heavy current pulse of approximately 100 amps is delivered to the ignition coil primary to produce a high voltage pulse necessary to trigger the flash lamp or burn a hole in a paper chart fastened to a drum type recorder.

The above described form of resonant charging circuit for charging of the condenser 162 is employed in preference to a resistance type charging circuit in which the voltage to which the condenser will charge before being discharged will vary with the speed of the engine. A variable charging voltage will affect the ionization time of the thyratron modulator tube as well as that of the flash lamp and is, in general, undesirable in measuring installations of the present character. The ideal charging condition would be one in which the charging condenser would always be charged to a voltage slightly less than that which is required to ionize the thyratron control tube before the positive tripping pulse is applied to the control grid thereof. The resonant charging circuit employed in the flasher control unit of the present invention approaches this condition by having a resonant period faster than that which is required by the maximum flashing rate and always charges the condenser to the same voltage regardless of the engine speed. Since the condenser is always charged to the same voltage, the amount of illumination per flash produced at high engine speeds is the same as that at the low speeds, and the lag or delay in the unit will be reduced by reason of the resonant charging circuit by as much as 0.5 degree at high engine speeds.

The flash lamp unit 28 located at the engine flywheel 42 is shown schematically in Fig. 3 and includes two control switches mounted therewith. One of these switches 112 operates the relay switch S-2 in the main flasher control unit 26 which controls the relay for the selection of a make or break flash. The other switch 170 is used to turn off the flash tube 164 by opening the ground return lead 172 on the ignition coil 166.

Figure 5:
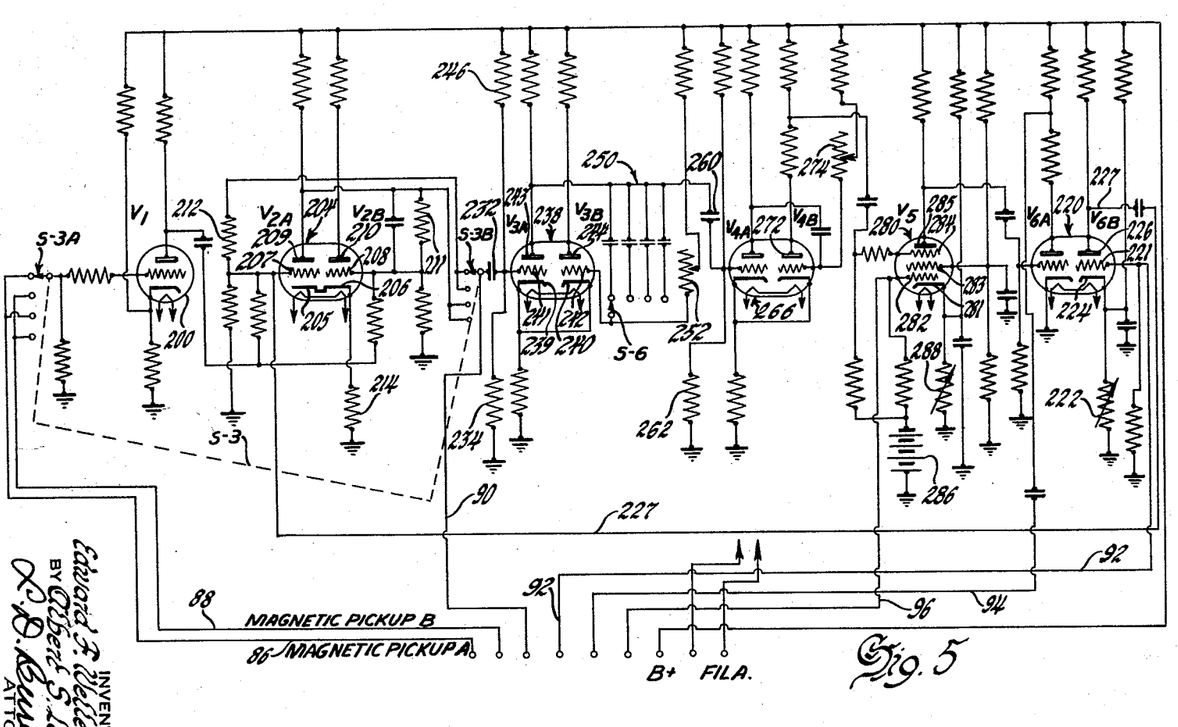
Fig. 5 is a schematic electrical circuit diagram of the balanced diaphragm signal selector or electronic commutator unit forming another part of the apparatus of Fig. 2.

Fig. 5 shows the circuit diagram of the balanced diaphragm signal selector or electronic commutator unit 30 while the waves A to Q of Fig. 6 show timing voltage wave shapes as might be observed at various locations therein with an oscilloscope. The output signal, shown in Fig. 6A or 6B, from one or the other of the magnetic pickups 32 or 34 is fed over line 86 or 88 to the input of the clipper amplifier stage ($V_1$), which is shown as including a triode tube 200 having the first section (S-3A) of a two section phase selector switch S-3 in the input thereof. The output from ($V_1$) is a clipped negative pulse, as shown in Figs. 6C and 6D, depending on which magnetic pickup 32 or 34 is connected by the phase selector switch S-3 to the clipper amplifier, and is fed to the input of the half-frequency square wave generator ($V_2$), which may be a double triode vacuum tube 204 having a pair of cathodes 205, 206; grids 207, 208; and plates 209, 210, connected substantially as shown.

This generator is the familiar binary scaler only one section of which can conduct at any particular instant of time. Assume initially that the first section ($V_{2A}$), constituted by the cathode 205, grid 207 and plate 209, is conducting. Under these conditions, the plate voltage of ($V_{2A}$) will be low, and since plate 209 is directly connected through resistance 211 to the grid 208 of the second section ($V_{2B}$), the grid voltage ($V_{2B}$) will be low. Likewise, the voltage of plate 210 and the voltage of grid 207 will be high, the plate 210 being connected to grid 207 through the resistor 212. Since ($V_{2A}$) is conducting, a voltage is developed across the common cathode resistor 214, and since the voltage of grid 208 is less than the cathode voltage, ($V_{2B}$) will remain non-conducting and in a stable state.

The application of a negative pulse from the output of the clipper amplifier ($V_1$) to the grid 207 of ($V_{2A}$) will cause the voltage of plate 209 and, hence, the voltage of grid 208 to rise. When the grid 208 is sufficiently positive to cause conduction, its plate voltage falls, and in turn further lowers the voltage of grid 207. Since this action is cumulative, the process goes to completion with ($V_{2A}$) non-conducting and ($V_{2B}$) conducting. The application of the next negative pulse to the grids 207 and 208, both of which are connected to receive the output of ($V_1$), will reverse the conducting tubes. Hence, the plate voltage wave shape will be that of a square wave which has a frequency of one-half of the input trigger frequency, as shown in Fig. 4G representing the voltage of plate 210 of ($V_{2B}$).

The "Phase" switch S-3 is a two section ganged switch, the first section S-3A of which, located in the input of ($V_1$), controls which magnetic pickup is used to trip generator ($V_2$) and the second section S-3B, connected in the output of ($V_2$), controls from which plate 209 or 210 ($V_{2A}$ or $V_{2B}$), the generator output signal is taken. With this arrangement it is possible to select a voltage square wave that is developed by the square wave generator ($V_2$) and which has the leading edge a rise in voltage at 0 degrees, 180 degrees, 360 degrees, and 540 degrees of crankshaft revolution as shown in Figs. 6G, H, I and J.

The spark input signal from the spark pickup 36 is shown in Fig. 6E and comes into the commutator unit on conductor 92 connected to the input grid 221 of the clipper inverter stage ($V_{6B}$), which constitutes one section of a double vacuum tube 220. The clipping level is adjustable and controlled by a potentiometer 222 connected to the cathode 224 of the inverter section ($V_{6B}$) of tube 220. The sharp negative pulse shown in Fig. 6F from the plate 226 of this inverter stage is fed to the input grid 207 of ($V_{2A}$) over conductor 227 in order to lock in the half-frequency generator in proper phase with the engine.

Figure 7:
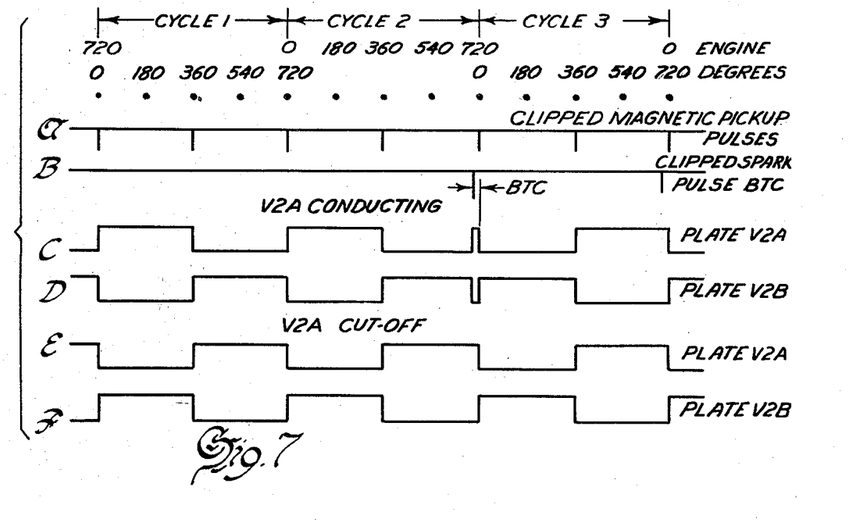

The voltage wave shapes of Fig. 7 illustrate the lock-in action caused by the application of the spark pickup synchronizing signal to the half-frequency generator. Fig. 7A illustrates the pulses from magnetic pickup 32 after they have been clipped in ($V_1$) and as they are applied to the input grids of the half-frequency generator ($V_2$). The inverted spark pickup signal pulse of Fig. 6F is illustrated in Fig. 7B. Assuming that the flasher control unit 26 is operating, and that the half-frequency generator stage ($V_2$) is out of step with the spark pickup signal, the output voltage wave shapes from plates 209 and 210 of ($V_2$) is shown in Figs. 5C and 5D, cycle 1, are obtained. If the spark is then turned on in cycle 2 and the spark timing is (BTC) before top center (advanced), as illustrated in Fig. 7B, then the half-frequency generator ($V_2$) will trigger twice in rapid succession bringing its square wave output into the desired phase relation as shown in cycle 3, Figs. 7C and 7D. If, however, the generator ($V_2$) is already synchronized, turning on the spark will have no effect on the operation of the generator, as illustrated in Figs. 7E and 7F (cf. Figs. 7C and 7E, cycle 3.

Figure 8:
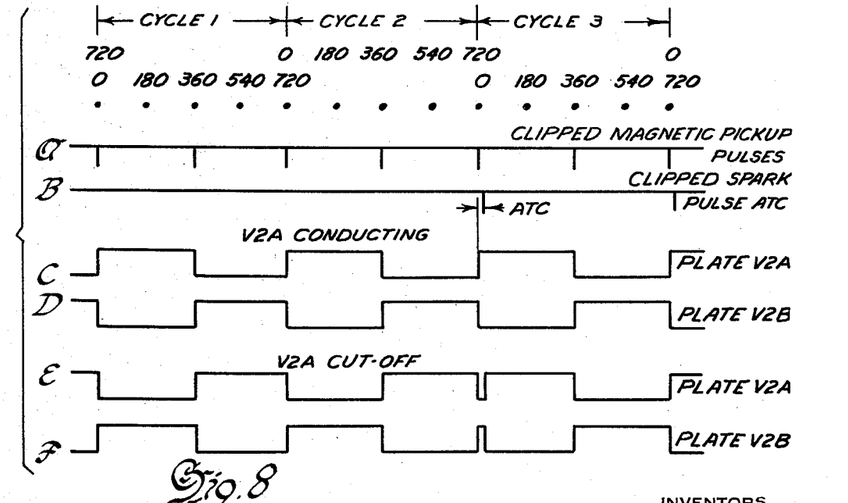

What happens when the spark is retarded is shown by the timing waves A to F of Fig. 8 which is generally similar to Fig. 7. When the spark is turned on, the half-frequency generator stage is forced to operate 180 degrees out of phase. Therefore, if the spark is required to be operated retarded, i.e., after top center as shown in Fig. 8B, either correction factors must be applied to the readings obtained on the crank angle voltage generator, or the synchronizing signal can be switched to the grid 208 of the second section ($V_{2B}$) of the half-frequency generator ($V_2$) to cause the square wave output therefrom to be in step with the spark pickup signal, as described above.

The output of either the first or second section of the half-frequency generator ($V_2$) is thus applied through the second section S-3B of the phase selector switch and is fed to the input of the gate position generator ($V_3$). The square wave from ($V_2$) is differentiated in a peaking or differentiating circuit formed by the coupling condenser 232 and grid resistor 234 in the input circuit of ($V_3$) and is used as a trigger pulse to operate the gate position generator, which is shown as a double triode vacuum tube 238 having a pair of cathodes 239, 240; grids 241, 242; and plates 243, 244, connected as shown.

Figure 9:
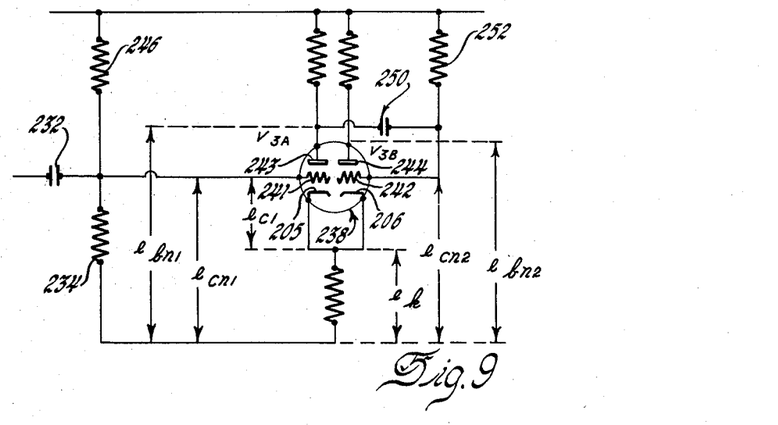
Fig. 9 is a simplified schematic representation of a delay multivibrator forming a part of the circuit of Fig. 5.
Figure 10:
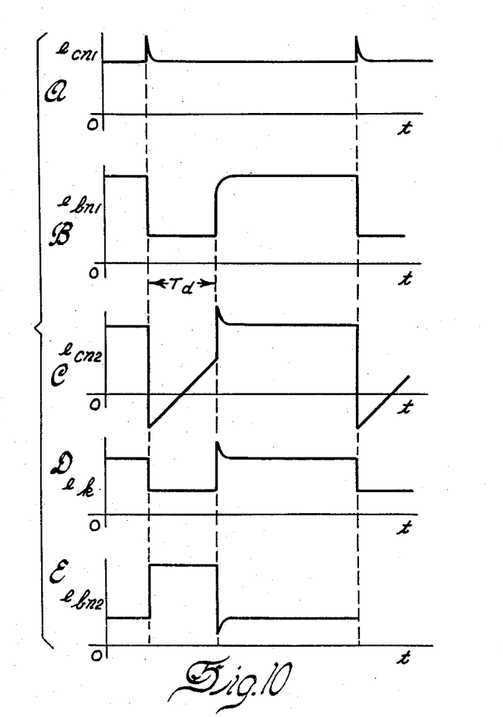
Fig. 10 illustrates wave forms used in explaining the operation of Fig. 9.

The operation of the gate position generator, which is a delay multivibrator, can best be described by referring to the simplified schematic circuit diagram of Fig. 9 and the wave forms A to E of Fig. 10. This circuit is also known as a one-shot multivibrator because in the absence of trigger pulses, the second section ($V_{3B}$) of the tube 238 conducts because of the positive return of its grid 242 and raises the voltage of both cathodes 205, 206. The voltage of grid 241 is adjusted to a fairly low value (about +70 v.) by the choice of voltage divider resistors 234 and 246 and, therefore, the cathode 239 of ($V_{3A}$) is positive with respect to the grid by a large enough value to keep the first section ($V_{3A}$) of tube 238 cut off.

The multivibrator may be driven by a positive pulse applied to the grid 241 of the normally off first section ($V_{3A}$) of tube 238, as shown in Fig. 10A which is the differentiated output of ($V_2$), or by negative pulses applied to the grid 242 of the conducting second section ($V_{3B}$) of this tube. If the positive pulse raises the voltage of grid 241 sufficiently to start current in ($V_{3A}$), a switching process occurs, and the plate current changes from ($V_{3B}$) to ($V_{3A}$). The switching proceeds as follows: current in ($V_{3A}$) causes the plate-to-ground voltage $eb_{n1}$ to drop, as shown in Fig. 10B. Because of the capacitance 250 in the plate circuit of ($V_3$), the grid-to-ground voltage $e_{cn2}$ of ($V_{3B}$) drops equally as shown in Fig. 10C, and since ($V_{3B}$) is connected as a cathode follower, $e_k$ also drops, Fig. 10D. The decrease in $e_k$ means an increase in the grid-to-cathode voltage for ($V_{3A}$) and an increase in the plate current of ($V_{3A}$).

Once cut off ($V_{3B}$) remains in this condition while the capacitance 250 discharges until the cut off point of ($V_{3B}$) is reached in the positive-going direction and plate current again begins to flow therein. Then the second switching process occurs. The current in ($V_{3B}$) raises the cathode voltage enough to cut off ($V_{3A}$), and the high plate voltage of ($V_{3A}$) helps turn on ($V_{3B}$). The output voltage of the gate position generator is the plate voltage of ($V_{3A}$) with respect to ground if a positive pulse is desired. The delay, shown as $t_d$ in Fig. 10B, in the switching process from ($V_{3A}$) to ($V_{3B}$) can be controlled by changing the RC time constant formed by the capacitance 250 and resistance 252, both of which may be adjustable or variable as shown in Fig. 5, to afford variable delay.

The output from the plate 210 of ($V_{2B}$) for the 0 degrees–180 degrees phase position is shown in Fig. 6K. This is the voltage from the half-frequency square wave generator ($V_2$) which supplies the trigger pulses for the gate positon generator ($V_3$). The output from ($V_{3A}$) is shown in Fig. 6L. This voltage is differentiated by a peaking or differentiating network formed by the coupling condenser 260 and grounded grid resistor 262 in the input of the next stage and is applied as a trigger signal to the second delay multivibrator or gate generator delay multivibrator ($V_4$), which generates the gating pulse. This delay multivibrator ($V_4$) includes a double triode vacuum tube 266 and is identical to the gate position delay multivibrator ($V_3$) except that the delay is not as great. The gate width is controlled with a potentiometer 274 in the positive grid return circuit of the second section ($V_{4B}$) of this stage. The output of the gate generator ($V_4$), shown in Fig. 6M, is taken from the plate 272 of 266 and is applied to the input of ($V_5$)

($V_5$) is a gate or coincidence stage and includes a pentode tube 280 having a cathode 281, control grid 282, screen grid 283, suppressor grid 284 and plate 285 connected as shown. Grids 282 and 284 are normally held below cutoff by the 7.5 v. biasing battery 286 and the cathode potential, which is adjustable with the adjustable gate level potentiometer 288 connected to the cathode 281. The balanced diaphragm indicator contacts are connected over line 96 to the input of ($V_5$), as shown in Fig. 2, and when the diaphragm contacts close, the 7.5 v. bias on grid 282 of ($V_5$) is removed and will allow the tube to conduct if the voltage on grid 284 is sufficiently positive. The position of the gate signal from ($V_4$) is adjustable and can be made to occur just before the "make" or "break" of the balanced diaphragm signal, thereby gating the "make" or "break" occurrence of the diaphragm contacts, as shown in Figs. 6M and 6N, which show the gate pulse and the balanced diaphragm signals, and Fig. 6–O, which shows the negative gated pulse as it appears in the plate circuit of ($V_5$).

An inverter stage ($V_{6A}$) is incorporated in the electronic commutator unit 30 to provide a positive pulse for operation of the flasher control circuit 26. This inverts the negative pulse to a positive pulse (Fig. 6P) and a fraction (Fig. 6Q) of the voltage output available is sent out over conductor 94 to the input of the squaring amplifier section ($V_9$) of the flasher control unit 26 through the commutator "on-off" switch (S–1).

Figure 11:
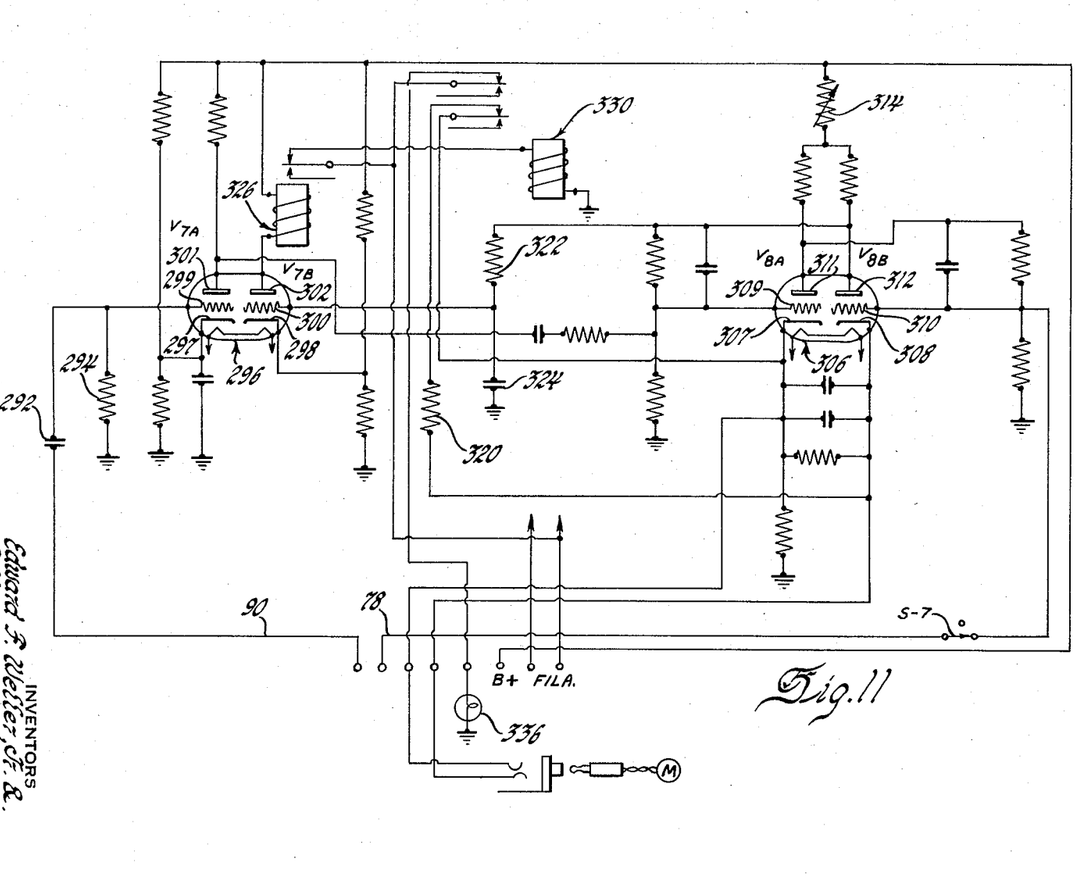
Fig. 11 is a schematic electrical circuit diagram of a crank angle voltage generator and display unit forming still another part of the apparatus of Fig. 2.
Figure 12:
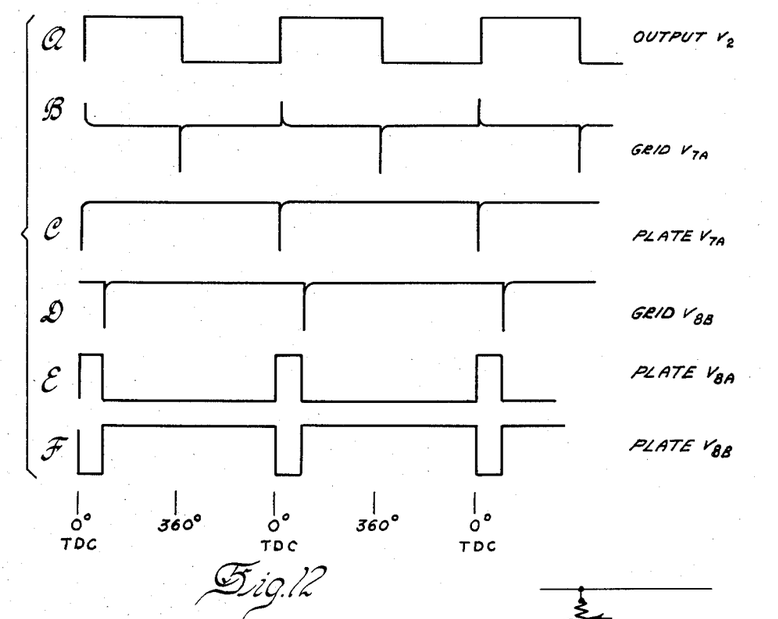
Fig. 12 illustrates timing wave forms pertinent to the apparatus of Fig. 11.

The crank angle voltage generator unit 38 shown in Fig. 11 receives a reference signal over line 90 from the output of the half-frequency square wave generator ($V_2$) of the commutator unit. This signal, shown in Fig. 12A, is differentiated in a peaking or differentiating circuit formed by the coupling condenser 292 and grounded grid resistor 294 in the input of stage ($V_{7A}$) yielding the waves of Fig. 12B. Tube ($V_{7A}$) is a clipper amplifier constituted by a double triode tube 296 having a pair of cathodes 297, 298; grids 299, 300; and plates 301, 302, connected as shown. The output of ($V_{7A}$), appearing at plate 301 thereof, is a sharp negative pulse, as shown in Fig. 12C. This pulse is fed to the input of the first section ($V_{8A}$) of the voltage generator stage ($V_8$) which also may comprise a double triode vacuum tube 306 having a pair of cathodes 307, 308; grids 309, 310; and plates 311, 312, connected as shown. The signal which occurs when the balanced diaphragm contacts "make" or "break" is fed to the grid 310 of the second section of ($V_8$) and comes into the unit on conductor 78.

Figures 13, 14:
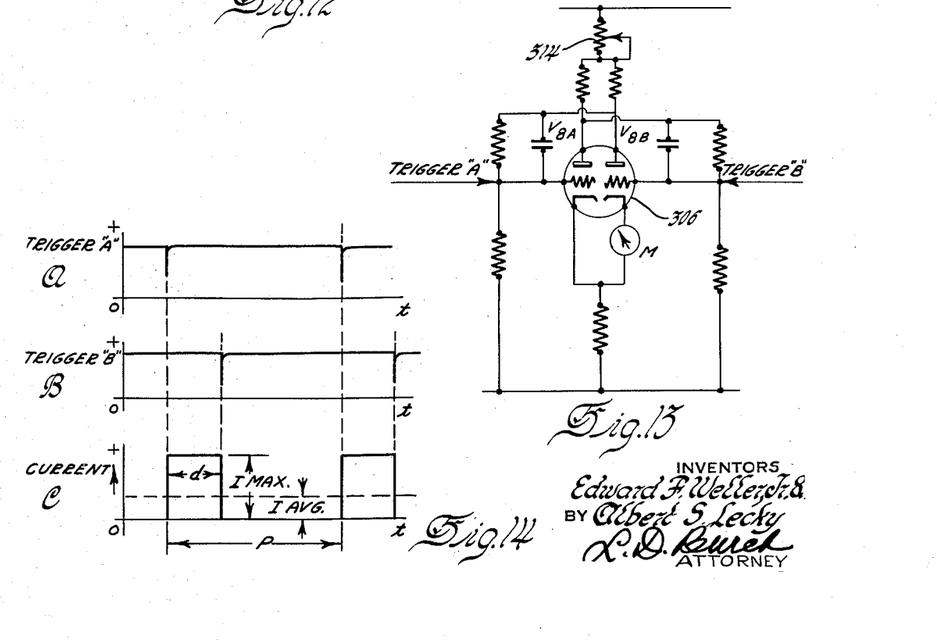
Fig. 13 is a simplified schematic representation of a multivibrator forming a part of the circuit of Fig. 12.
Fig. 14 illustrates wave forms used in explaining the operation of Fig. 13.

In order to discuss the voltage generator more fully, a simplified circuit diagram of the voltage generator is shown in Fig. 13 along with the voltage and current wave shapes A, B, and C shown in Fig. 14 for the circuit. If ($V_{8A}$) is conducting, the phase trigger or first reference pulse (trigger "A") shown in Fig. 14A from ($V_{2A}$) of the commutator unit will cause the current to be transferred from ($V_{8A}$) to ($V_{8B}$) and, hence, current will start to flow through the meter (M). The maximum current that will flow can be controlled by the adjustable rheostat 314 in the plate voltage supply circuits of tube 306. The application of the balanced diaphragm indicator signal (trigger "B") shown in Fig. 11B from ($V_{11A}$) of the flasher control unit will cause the current to be transferred back to ($V_{8A}$) which cuts off the current in the meter. This current is also called an electronic switch.

The meter current, $I_{avg}$, can be expressed as a function of the maximum current $I_{max}$, the period of conduction of ($V_{8B}$), designated as $d$ in Fig. 14C, and the period of one cycle P. The equation relating these quantities is:

$$I_{avg}=I_{max}\times\frac{d}{p} \qquad (1)$$

if
$$I_{max}=5\text{ma.}$$
$$P=720°$$

then
$$I_{avg}=d\times 6.94\times 10-3\text{ ma.} \qquad (2)$$

or
$$d=\frac{I_{avg}}{6.94}\times 103\text{ degrees.} \qquad (3)$$

Thus the angle at which the balanced diaphragm indicator makes or breaks can be determined by reading the average current on the meter and then solving for "$d$" in Equation 3 above.

In order to read 720 degrees, a meter with a full scale value of 5 milliamperes would be required. This does not allow the crank angle to be read to a high degree of accuracy. The reference signal or phase trigger signal from the half-frequency generator ($V_{2A}$) of the commutator unit is developed from the magnetic pickup signals, which can be selected each 180 degrees, and allows the maximum crank angle reading to be reduced to 180 degrees, which improves the reading accuracy on the meter. This explains the reason for using two magnetic pickups. In this manner a 1 ma. meter with a safety factor of 20 degrees may be used, making the full scale reading 200 degrees and giving a scale factor of 200 to simplify computing the crank angle.

In the absence of balanced diaphragm signals, tube ($V_{8B}$) would conduct continually, which would allow $I_{avg}$ to be equal to $I_{max}$, or 5 ma. would flow through a 1 ma. meter. In order to prevent damage to the meter, a relay protection circuit is used which places an additional shunt including resistance 320, Fig. 11, across the meter. The plate voltage of ($V_{8B}$) is integrated by the resistor 322 and condenser 324, connected as shown, and fed to the grid 300 of ($V_{7B}$). When this voltage is lower than the cathode potential of ($V_{7B}$), plate current in ($V_{7B}$) ceases to flow and the relay 326 in the plate circuit thereof is deenergized. The contacts of relay 326 are connected in the energizing circuit of the coil of another relay 330 which is deenergized upon cessation of current flow in relay 326 to shunt the meter with resistance 320. The drop-out current and adjacent of the relay 326 are set so that when the crank angle is between 190 degrees and 200 degrees the resistance 320 will shunt the meter. At the same time, an overload light shown at 336 in Fig. 11 is turned on by the relay 330. If the overload light is energized during the normal use of the apparatus, the phase selector switch (S–3) is in the wrong quadrant for proper operation.

The meter (M) may be calibrated by preventing the trigger pulses from the flasher control unit 26 from triggering ($V_{8B}$), as by opening switch S–7, which is a calibration switch. The shunt resistor 320 is placed across the meter, and $I_{max}$ is adjusted with potentiometer 314 to read 1 ma.

If the balanced diaphragm fails to operate or operates more than once each engine cycle, the voltage generator will not operate properly. However, the latter condition may be eliminated by using the commutator. Inspection of Figs. 14A to 14C show that if one current pulse is eliminated the average current is in error. The time constant used to operate the overload relay 330 should thus be chosen fast enough to respond to this condition and operate the overload light 336.

What is claimed is:

1. Apparatus for selectively sampling the pressure in a cylinder of an internal combustion engine having a reciprocating piston including, in combination, a balanced diaphragm adapted to sense the difference between the pressure in said engine cylinder and some predetermined pressure, a pair of electrical contacts operated by said diaphragm to close when said cylinder pressure exceeds said predetermined pressure and to open when the cylinder pressure falls below said predetermined pressure, a pulse generator connected with said contacts for generating a pulse each time said contacts close and each time the contacts open, said pulse generator including selective means for affording a selection between the pulses produced by the closing of the contacts and the pulses produced by the opening of the contacts such that the output of said generator is a first train of pulses representing the selected operation of the balanced diaphragm, a second pulse generator operatively connected with said reciprocating piston for producing an electrical pulse output each time the piston passes a predetermined point in the engine cycle to provide a second pulse train, a gate circuit serially connected between said balanced diaphragm and said first pulse generator, means including a variable time delay circuit connecting said second pulse generator with said gate circuit such that the gate circuit will open at some preselected time after the occurrence of a pulse in the second pulse train and remain open for a relatively short time compared to the engine cycle, a bistable multivibrator connected to be driven into a first stable state by each pulse in said second pulse train and driven into its other stable state by each pulse in said first pulse train, and indicating means in the output of said multivibrator responsive to the average dwell time in said first stable state, said average time being representative of the piston travel between said predetermined point and said selected operation of the balanced diaphragm.

2. Apparatus for selectively sampling the pressure in a cylinder of an internal combustion spark ignition engine having a reciprocating piston including, in combination, a balanced diaphragm adapted to sense the difference between the pressure in said engine cylinder and some predetermined pressure, a pair of electrical contacts operated by said diaphragm to close when said cylinder pressure exceeds said predetermined pressure and to open when the cylinder pressure falls below said predetermined pressure, a pulse generator connected with said contacts for generating a pulse each time said contacts close and each time the contacts open, said pulse generator including selective means for affording a selection between the pulses produced by the closing of the contacts and the pulses produced by the opening of the contacts such that the output of said generator is a first train of pulses representing the selected operation of the balance diaphragm, a second pulse generator operatively connected with said reciprocating piston for producing an electrical pulse output each time the piston passes a predetermined point in the engine cycle to provide a second pulse train, means operatively connected with said spark ignition for synchronizing said second pulse generator with said spark ignition, a gate circuit serially connected between said balanced diaphragm and said first pulse generator, means including a variable time delay circuit connecting said second pulse generator with said gate circuit such that the gate circuit will open at some preselected time after the occurrence of a pulse in the second pulse train and remain open for a relatively short time compared to the engine cycle, a bistable multivibrator connected to be driven into a first stable state by each pulse in said second pulse train and driven into its other stable state by each pulse in said first pulse train, indicating means in the output of said multivibrator responsive to the average dwell time in said first stable state, said average time being representative of the piston travel between said predetermined point and said selected operation of the balanced diaphragm and second indicating means in the output of said multivibrator responsive to the instantaneous dwell time of said multivibrator in said first stable state to produce an indication when said selected operation does not occur within a predetermined period of time in any one engine cycle.

References Cited in the file of this patent

UNITED STATES PATENTS

| | | |
|---|---|---|
| 2,085,203 | Schlesmann et al. | June 29, 1937 |
| 2,133,437 | Dodds | Oct. 28, 1938 |
| 2,349,560 | Reijnst | May 23, 1944 |
| 2,478,903 | Edgerton | Aug. 16, 1949 |
| 2,521,141 | Allen | Sept. 5, 1950 |
| 2,688,248 | Hart et al. | Sept. 7, 1954 |
| 2,715,832 | McCollum et al. | Aug. 23, 1955 |

OTHER REFERENCES

Article: "A New High Speed Engine Indicator," by Taylor and Draper in Mechanical Engineering, vol. 55, 1933, pp. 109–171.